United States Patent
Xia et al.

(10) Patent No.: US 10,958,529 B2
(45) Date of Patent: Mar. 23, 2021

(54) CLIQUE NETWORK IDENTIFICATION METHOD AND APPARATUS, COMPUTER DEVICE, AND COMPUTER-READABLE STORAGE MEDIUM

(71) Applicant: TENCENT TECHNOLOGY (SHENZHEN) COMPANY LIMITED, Shenzhen (CN)

(72) Inventors: Bin Xia, Shenzhen (CN); Ming Wu, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

(21) Appl. No.: 16/903,480

(22) Filed: Jun. 17, 2020

(65) Prior Publication Data

US 2020/0313975 A1 Oct. 1, 2020

Related U.S. Application Data

(63) Continuation of application No. PCT/CN2019/078349, filed on Mar. 15, 2019.

(30) Foreign Application Priority Data

Apr. 4, 2018 (CN) .......................... 201810298443.1

(51) Int. Cl.
*H04L 12/24* (2006.01)
(52) U.S. Cl.
CPC ............ *H04L 41/142* (2013.01); *H04L 41/12* (2013.01)
(58) Field of Classification Search
CPC ............................... H04L 41/142; H04L 41/12
See application file for complete search history.

(56) References Cited

U.S. PATENT DOCUMENTS

2008/0025339 A1 1/2008 Le et al.
2013/0272162 A1 10/2013 Li et al.
(Continued)

FOREIGN PATENT DOCUMENTS

| CN | 102346766 A | 2/2012 |
| CN | 103368910 A | 10/2013 |

(Continued)

OTHER PUBLICATIONS

The World Intellectual Property Organization (WIPO) International Search Report for PCT/CN2019/078349 dated Jun. 3, 2019 5 Pages (including translation).

*Primary Examiner* — Benjamin M Thieu
(74) *Attorney, Agent, or Firm* — Anova Law Group, PLLC

(57) ABSTRACT

The present disclosure provides a method for identifying a clique network using a Pregel graph computing framework. The method includes determining, according to a data transfer feature of a target clique, a transmitting direction of attribute values of nodes; transmitting, an edge vector of the edge and an attribute value of the first node to the second node along the transmitting direction in a constructed data transmission relationship network, the edge vector comprising a plurality of data transfer eigenvalues; performing, weighted calculation on the edge vector received by the second node to obtain an optimal weighted edge; iterating, the above operations; and determining, according to attribute values of the nodes after the one or more iterations, nodes in the target clique, and determining attributes of the nodes in the target clique.

20 Claims, 11 Drawing Sheets

(56) References Cited

U.S. PATENT DOCUMENTS

2015/0356444 A1 12/2015 Zhao et al.
2017/0364702 A1* 12/2017 Goldfarb ................. H04L 63/14
2017/0366395 A1* 12/2017 Goldfarb ............. H04L 12/4641
2017/0366416 A1* 12/2017 Beecham ................ H04L 45/50

FOREIGN PATENT DOCUMENTS

CN 103914493 A 7/2014
CN 105205184 A 12/2015

* cited by examiner

CLIQUE NETWORK IDENTIFICATION METHOD AND APPARATUS, COMPUTER DEVICE, AND COMPUTER-READABLE STORAGE MEDIUM

RELATED APPLICATIONS

This application claims the priority to PCT Application No. PCT/CN2019/078349, filed on Mar. 15, 2019, which claims priority to Chinese patent application No. 2018102984431, filed with the National Intellectual Property Administration, PRC on Apr. 4, 2018 and entitled "CLIQUE NETWORK IDENTIFICATION METHOD AND APPARATUS, SERVER, AND COMPUTER-READABLE STORAGE MEDIUM." The two applications are both incorporated herein by reference in their entirety.

FIELD OF THE TECHNOLOGY

This application relates to the field of data processing, and in particular, to a clique network identification method and apparatus, a computer device, and a computer-readable storage medium.

BACKGROUND OF THE DISCLOSURE

With development of relationship networks, different types of cliques gradually form in a data transmission relationship network. Mining a clique with a target feature in a data transmission relationship network is extremely important to supervision of the relationship network information.

Currently, relationship sub-network mining in the data transmission relationship network is mainly implemented by using a tag diffusion algorithm, which often cannot distinguish data transmission in a clique with a target feature and data transmission in a clique without a target feature.

SUMMARY

According to embodiments of this application, a clique network identification method and apparatus, a server, and a computer-readable storage medium are provided.

An aspect of the embodiments of this application provides a method for identifying a clique network using a Pregel graph computing framework. The method includes determining, according to a data transfer feature of a target clique, a transmitting direction of attribute values of nodes; transmitting, on an edge connecting a first node and a neighboring second node, an edge vector of the edge and an attribute value of the first node to the second node along the transmitting direction in a constructed data transmission relationship network, the edge vector comprising a plurality of data transfer eigenvalues; performing, weighted calculation on the edge vector received by the second node according to a preset calculation logic, to obtain an optimal weighted edge, the calculation logic matching the data transfer feature of the target clique; updating, an attribute value of the second node according to an attribute value of a first node connected to the optimal weighted edge; iterating, operations of transmitting, on an edge connecting a first node and a neighboring second node, an edge vector of the edge and an attribute value of the first node to the second node along the transmitting direction, performing weighted calculation on the edge vector received by the second node according to the preset calculation logic, to obtain an optimal weighted edge, and updating an attribute value of the second node according to an attribute value of a first node connected to the optimal weighted edge, until the iteration meets a preset stop condition; and determining, according to attribute values of the nodes after the one or more iterations, nodes in the target clique, and determining attributes of the nodes in the target clique.

Another aspect of the embodiments of this application provides a computer device, including a memory and a processor, the memory storing a computer-readable instruction, the computer-readable instruction, when executed by the processor, causing the processor to perform: determining, according to a data transfer feature of a target clique, a transmitting direction of attribute values of nodes; transmitting, on an edge connecting a first node and a neighboring second node, an edge vector of the edge and an attribute value of the first node to the second node along the transmitting direction in a constructed data transmission relationship network, the edge vector comprising a plurality of data transfer eigenvalues; performing, weighted calculation on the edge vector received by the second node according to a preset calculation logic, to obtain an optimal weighted edge, the calculation logic matching the data transfer feature of the target clique; updating, an attribute value of the second node according to an attribute value of a first node connected to the optimal weighted edge; iterating, operations of transmitting, on an edge connecting a first node and a neighboring second node, an edge vector of the edge and an attribute value of the first node to the second node along the transmitting direction, performing weighted calculation on the edge vector received by the second node according to the preset calculation logic, to obtain an optimal weighted edge, and updating an attribute value of the second node according to an attribute value of a first node connected to the optimal weighted edge, until the iteration meets a preset stop condition; and determining, according to attribute values of the nodes after the one or more iterations, nodes in the target clique, and determining attributes of the nodes in the target clique.

An aspect of the embodiments of this application provides one or more non-transitory storage media storing a computer-readable instruction, the computer-readable instruction, when executed by one or more processors, causing the one or more processors to perform: determining, according to a data transfer feature of a target clique, a transmitting direction of attribute values of nodes; transmitting, on an edge connecting a first node and a neighboring second node, an edge vector of the edge and an attribute value of the first node to the second node along the transmitting direction in a constructed data transmission relationship network, the edge vector comprising a plurality of data transfer eigenvalues; performing, weighted calculation on the edge vector received by the second node according to a preset calculation logic, to obtain an optimal weighted edge, the calculation logic matching the data transfer feature of the target clique; updating, an attribute value of the second node according to an attribute value of a first node connected to the optimal weighted edge; iterating, operations of transmitting, on an edge connecting a first node and a neighboring second node, an edge vector of the edge and an attribute value of the first node to the second node along the transmitting direction, performing weighted calculation on the edge vector received by the second node according to the preset calculation logic, to obtain an optimal weighted edge, and updating an attribute value of the second node according to an attribute value of a first node connected to the optimal weighted edge, until the iteration meets a preset stop condition; and determining, according to attribute values of the nodes after the one or more iterations, nodes in the target clique, and determining attributes of the nodes in the target clique.

Details of one or more embodiments of this application are provided in the following accompanying drawings and descriptions. Other features, objectives, and advantages of this application become more obvious from the specification, the accompanying drawings, and the claims.

BRIEF DESCRIPTION OF THE DRAWINGS

To describe the technical solutions of the embodiments of this application more clearly, the following briefly introduces the accompanying drawings required for describing the embodiments. Apparently, the accompanying drawings in the following description show only some embodiments of this application, and a person of ordinary skill in the art may still derive other drawings from these accompanying drawings without creative efforts.

DESCRIPTION OF EMBODIMENTS

To make the invention objectives, features, and advantages of this application clearer and more comprehensible, the following clearly and completely describes the technical solutions in the embodiments of this application with reference to the accompanying drawings in the embodiments of this application. Apparently, the embodiments described are merely some rather than all of the embodiments of this application. All other embodiments obtained by a person skilled in the art based on the embodiments of this application without creative efforts shall fall within the protection scope of this application.

Figure 1:
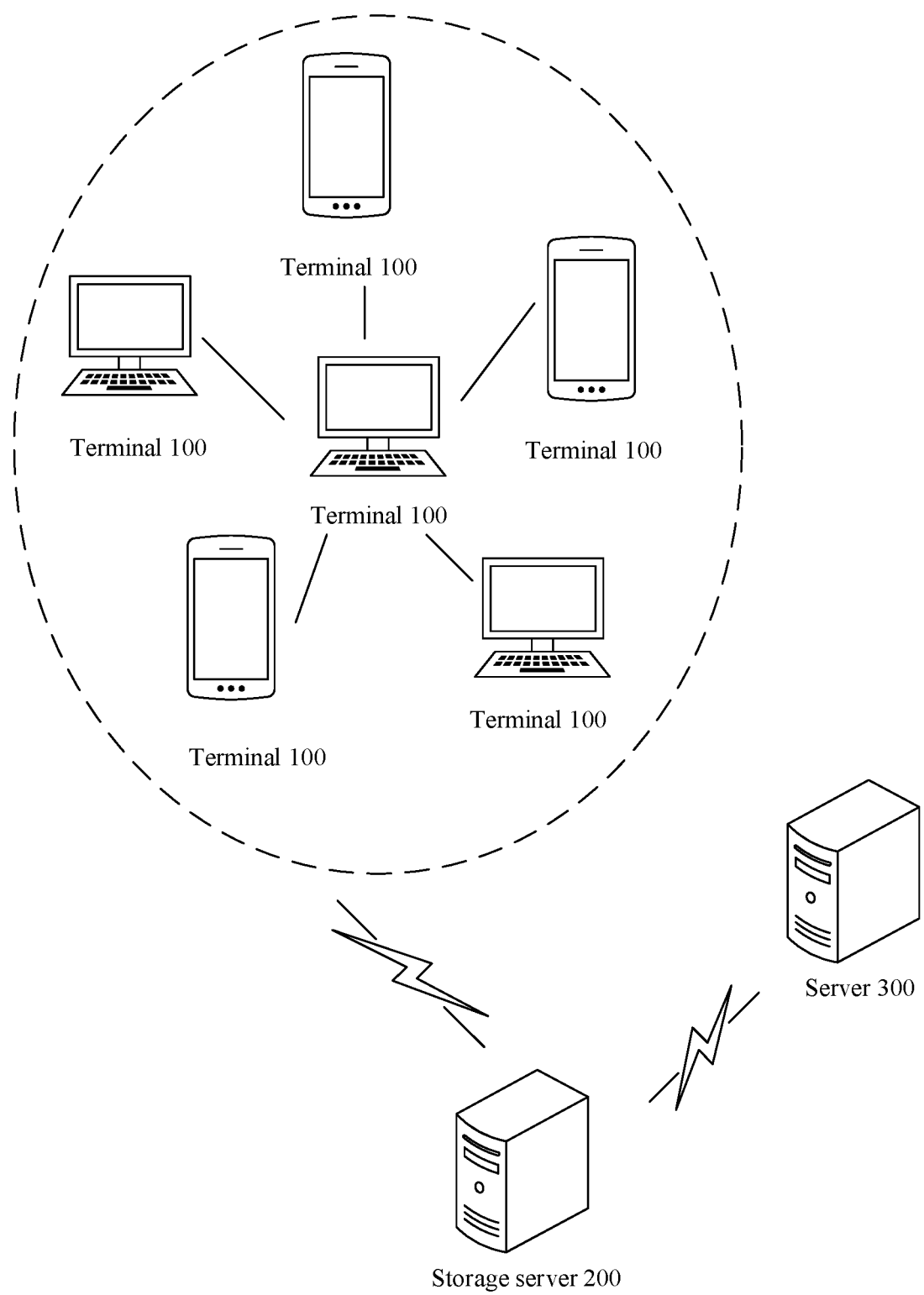
FIG. 1 is a diagram of an application environment of a clique network identification method according to an embodiment of this application.

FIG. 1 is a diagram of an application environment of a clique network identification method according to an embodiment of this application. As shown in FIG. 1, a plurality of terminals 100 constitute a data transmission relationship network. A storage server 200 records related information and data of data exchange between the terminals 100 in the data transmission relationship network. A server 300 identifies, according to the related information and data recorded in the storage server 200, a target clique from the data transmission relationship network by using a clique network identification method provided in the following embodiments. In one embodiment, the server 300 may be a distributed server cluster of a Pregel graph computing framework. The server 200 may also be a distributed server cluster. The Pregel graph computing framework is a computing framework for distributed graph computing, and the graph includes nodes and edges.

The data transmission relationship network is a network topology structure including at least two nodes and a relationship between the nodes. For example, there are three computer devices in communication relationships. To describe the communication relationships between the three computer devices more clearly, the three computer devices are abstracted into three nodes: a node A, a node B, and a node C, and an edge connecting two nodes is used to represent a communication relationship between two computer devices. Therefore, a data transmission relationship network including the three computer devices is constituted. The storage server records related information and data, for example, a communication duration between one computer device and another computer device, a communication frequency between one computer device and another computer device within a preset time period, and a time period in which one computer device communicates with another computer device.

A clique refers to a group of nodes with the same feature in the data transmission relationship network, and a data transfer relationship is formed between nodes in the group of nodes. A clique network is a network topology structure formed by data transmission relationships between all the nodes in the group. For example, in a data transmission relationship network with a virtual resource transfer relationship, the node is a computer device corresponding to an account transferring a virtual resource. When a virtual resource is transferred between nodes, if a virtual resource transfer keyword in a note is a word related to gambling such as "bet", "wager", and "counter", correspondingly, the nodes constitute a gambling clique. The nodes and the virtual resource transfer relationship between the nodes together constitute a clique network.

Figure 2:
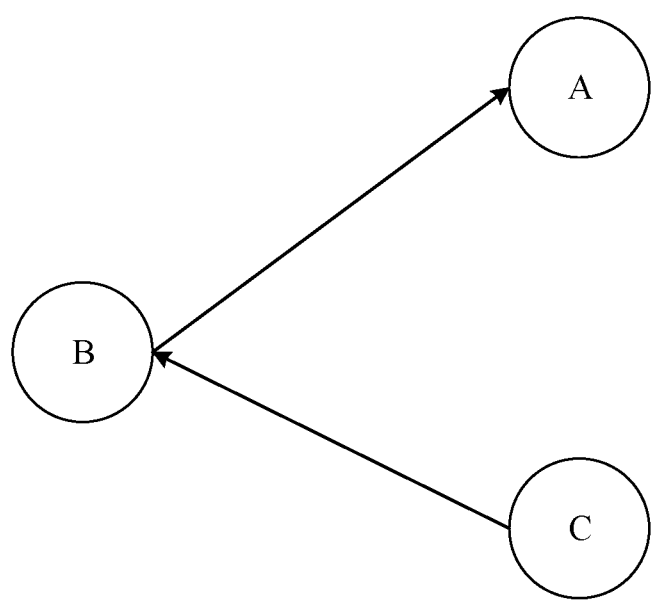
FIG. 2 is a schematic diagram of a data transmission relationship network in a clique network identification method according to an embodiment of this application.

FIG. 2 is a schematic diagram of a data transmission relationship network in a clique network identification method according to an embodiment of this application. In the embodiments of this application, the data transmission relationship network may specifically be a virtual resource transfer relationship network, but the virtual resource transfer relationship does not constitute any limitation on the type of the data transmission relationship network to which this application is applicable. The virtual resource transfer relationship network includes a plurality of nodes, and the node represents a computer device corresponding to a sender or a receiver of a virtual resource, for example, a computer device used by a fund sender account or a fund receiver account. Each edge indicates that there is data transmission between two nodes connected to the edge, that is, an edge is formed by a virtual resource transfer relationship between two nodes. The virtual resource may be a resource used for exchanging a commodity or a service, for example, money, a point, a golden bean, a gift voucher, a redeem voucher, a coupon, a gift card, or a wealth management fund, which is not specifically limited in the embodiments of the present disclosure. The virtual resource may be transferred on an Internet platform.

Using FIG. 2 as an example, FIG. 2 shows a virtual resource transfer relationship network, and nodes in the virtual resource transfer relationship network include a node A, a node B, and a node C. A direction of an arrow between nodes indicates a virtual resource transfer relationship. To be specific, the node B transfers a virtual resource to the node A, and the node C transfers a virtual resource to the node B. In one embodiment, a data transmission relationship network includes a large quantity of nodes, and a to-be-identified target clique needs to be divided from the large quantity of nodes according to a feature of the clique. The target clique may be a target clique including nodes belonging to a gambling group in a virtual resource transfer relationship network, or may be a target clique including nodes having a commuting relationship in a passenger transportation network, or a target clique including nodes having a communication service in a communication relationship network. In addition, to further clarify an attribute of each node in the clique, the attribute may be a core degree of the node in the clique.

The following describes a clique network identification method and apparatus, a computer device, and a computer-readable storage medium in detail in the embodiments. In the following embodiments, clique network identification may be performed by using a Pregel graph computing framework and an API in Spark GraphX. Data transmission information of nodes in a data transmission relationship network is stored in a plurality of servers, and the clique network identification method in this embodiment is performed according to the data transmission information.

Figure 3:
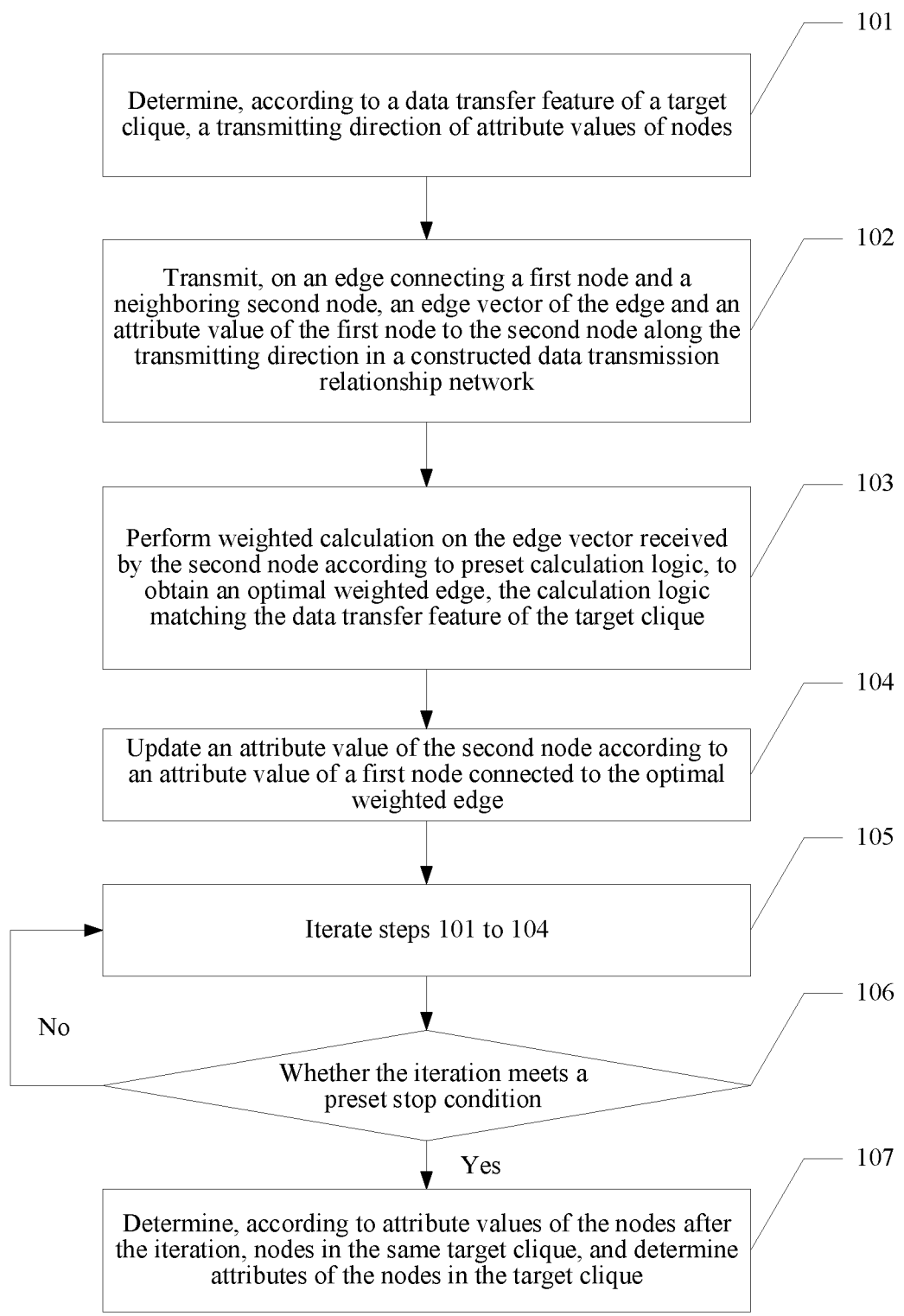
FIG. 3 is a flowchart of a clique network identification method according to an embodiment of this application.

FIG. 3 is a flowchart of a clique network identification method according to an embodiment of this application. As shown in FIG. 3, the method is performed by a server, and the method includes the following steps:

101: Determine, according to a data transfer feature of a to-be-identified target clique, a transmitting direction of attribute values of nodes.

The server determines, according to the data transfer feature of the to-be-identified target clique, the transmitting direction of the attribute values of the nodes.

Specifically, the server determines that the transmitting direction of the attribute values of the nodes is a reverse direction of data transfer between the nodes in a case that the data transfer feature of the to-be-identified target clique is a divergent type.

The divergent type indicates that there is a plurality of data receiver nodes for the same data sender node. For example, a node A transfers data to a node B and a node C, the node B transfers data to a node D and a node E, and the node C transfers data to a node F and a node G. In a clique including ABCDEFG, data is transferred from the node A to four nodes D, E, F, and G through the node B and the node C. In this case, the data transfer feature is a divergent type. In the divergent-type target clique, the same data sender node corresponds to at least two data receiver nodes.

The transmitting direction of the attribute values of the nodes is a direction of data transfer between the nodes in a case that the data transfer feature of the to-be-identified target clique is a convergent type. The convergent type indicates that there is a plurality of data sender nodes for the same data receiver node. For example, a node B and a node C transfers data to a node A, a node D and a node E transfers data to the node B, and a node F and a node G transfers data to the node C. In a clique including ABCDEFG, data is transferred from four nodes D, E, F, and G to the node A through the node B and the node C. In this case, the data transfer feature is a convergent type. In the convergent-type target clique, the same data receiver node corresponds to at least two data sender nodes.

In one embodiment, if a data transmission relationship network is a passenger transportation network, nodes are computer devices corresponding to stations, and the to-be-identified target clique is a to-be-opened station clique including stations that is the most worthy of a passenger line, a transportation data transfer feature of the to-be-opened station clique is the convergent type. That is, passenger cars converge to one station. Therefore, when a network constituted by the to-be-opened station clique is identified, a transmitting direction of attribute values of the nodes is determined to be a direction of data transfer between the nodes.

102: Transmit, on an edge connecting a first node and a neighboring second node, an edge vector of the edge and an attribute value of the first node to the second node along the transmitting direction in a constructed data transmission relationship network.

Specifically, the data transmission relationship network may be constructed according to the information and data recorded in the storage server 200 shown in FIG. 1, which corresponds to a real data transmission network.

The edge vector includes a plurality of data transfer eigenvalues, that is, the edge vector is used for describing a feature of the data transfer according to at least one unidimensional vector. For example, the edge vector may include a number of times that a data transfer keyword matches a keyword in the data transfer feature of the to-be-identified target clique and a transfer frequency, number of transfers, and a quantity transferred within a preset period.

The keyword is a keyword corresponding to the feature of the to-be-identified target clique. For example, if the to-be-identified target clique in the virtual resource transfer relationship network is a gambling group, a resource transfer keyword may be a word related to gambling such as "bet", "wager", and "counter". In a passenger transportation network, the server may collect passenger transportation relationship data between stations of each month within one year by using one year as a statistical period and using one month as a sampling resolution. The edge vector may include an average value of passenger transportation quantities between the stations within one year, distribution of passenger transportation quantities between the stations in each month within one year, and a variance of the passenger transportation quantities between the stations between each month within one year.

The edge refers to an edge formed between nodes due to a data transfer relationship between the nodes. For example, a node A transfers data to a node B, and therefore, an edge is formed between the node A and the node B.

The attribute value is a parameter value representing an attribute of a node, and may include a node identification (ID) of the node, a clique core index, and another parameter value representing the attribute of the node. The clique core index can represent a core degree of the node in the data transmission relationship network.

In the data transmission relationship network, the second node may transfer data to a plurality of first nodes, or a plurality of first nodes may transfer data to the second node. Therefore, along the transmitting direction, a plurality of edge vectors and attribute values of the first nodes are transmitted to the second node. The second node may be a receiver or a sender of data transfer, and the second node is a receiver of the attribute value. A specific transmitting form may be transmitting by using a message, and the message includes the edge vector and the attribute value.

Because of convergence and hierarchy of data transfer relationships in a clique, the edge vector is transmitted along the transmitting direction. If the target clique is divergent, an attribute of a receiver of data transfer is used to affect an attribute of a sender of data transfer. If the target clique is convergent, an attribute of a sender of data transfer is used to affect an attribute of a receiver of data transfer.

Therefore, an algorithm in this embodiment of this application may be completed in the server, and the server may transmit the edge vector of the edge and the attribute value of the first node to the second node, to start a calculation process of the target clique.

103: Perform weighted calculation on the edge vector received by the second node according to preset calculation logic, to obtain an optimal weighted edge, the calculation logic matching the data transfer feature of the to-be-identified target clique.

The optimal weighted edge is an edge with a largest weight between the first nodes and the second node, and a data transfer relationship represented by the edge has a largest weight.

The calculation logic is weight-related calculation logic, and matches the data transfer feature of the to-be-identified target clique. That is, the optimal weighted edge varies with different calculation logic, and a weight matches the data transfer feature of the target clique.

A weight value of each data transfer eigenvalue in the edge vector is assigned by the calculation logic, and the weight value assigned by the calculation logic to the data transfer eigenvalue matches the data transfer feature of the target clique. The determination of the optimal weighted edge significantly affects a finally determined clique.

Specifically, different weight values are pre-assigned to each data transfer eigenvalue in the calculation logic. For example, a data transfer frequency, number of transfers, and a transfer quantity are respectively assigned weight values of 0.6, 0.3, and 0.1. If on a first edge, an edge vector includes a data transfer frequency of once per day, number of transfers of 4 times, and a transfer quantity of 1,000,000 (divided by 100,000 to obtain 10); and on a second edge, an edge vector includes a data transfer frequency of 1.5 times per day, number of transfers of 6 times, and a transfer quantity of 200,000 (divided by 100,000 to obtain 2), after weighted calculation, an edge weight of the first edge is 1*0.6+4*0.3+10*0.1=2.8, and an edge weight of the second edge is 1.5*0.6+6*0.3+2*0.1=2.9. Through comparison between the two edge weights, the second edge is an optimal weighted edge.

104: Update an attribute value of the second node according to an attribute value of a first node connected to the optimal weighted edge.

Specifically, in the data transmission relationship network, each second node has only one first node connected to the second node through the optimal weighted edge. The attribute value of the second node is updated according to an attribute value of the first node.

105: Iterate steps 101 to 104.

106: Determine whether the iteration meets a preset stop condition.

Specifically, steps of transmitting, on edges connecting first nodes and a neighboring second node, a plurality of edge vectors of the edges and attribute values of the first nodes to the second node along the transmitting direction of the attribute values, performing weighted calculation on the plurality of edge vectors received by the second node according to preset calculation logic, to obtain an optimal weighted edge, and updating an attribute value of the second node according to an attribute value of a first node connected to the optimal weighted edge are iterated, that is, steps 101 to 104 are iterated to continuously update an attribute value of an edge vector receiver until the iteration meets the preset stop condition.

The preset stop condition may be that a quantity of iterations exceeds a preset iteration quantity threshold, or a time consumed for iterative calculation exceeds a preset iteration time threshold.

The preset stop condition may alternatively be that in the data transmission relationship network, there is no second node that can be updated in the attribute value.

It may be understood that, after each iteration, it is determined whether the iteration meets the preset stop condition. If the iteration meets the preset stop condition, step 107 is performed; otherwise, a next iteration is performed.

107: Determine, according to attribute values of the nodes after the iteration, nodes in the same target clique, and determine attributes of the nodes in the target clique.

The attribute values of the nodes can be used to determine the nodes belonging to the same clique, to obtain a target clique network.

The attribute values of the nodes can also be used to determine the attributes of the nodes in the clique. The attribute refers to a core degree of each node in the clique, that is, an importance degree of each node. For example, in a marketing clique network, attributes such as a supplier, an agent, and a customer in the marketing clique can be determined according to attribute values of nodes. In a gambling clique network, attributes such as a banker, a claimant, and a gambling player in the gambling clique can be determined according to attribute values of nodes.

In the clique network identification method provided in this embodiment, the edge vector of the edge between the first node and the second node is transmitted to the second node along the transmitting direction determined according to the data transfer feature of the to-be-identified target clique; weighted calculation is performed on the edge vector received by the second node according to the preset calculation logic, to obtain the optimal weighted edge; the attribute value of the second node is updated according to the attribute value of the first node connected to the optimal weighted edge; and after a plurality of iterations of the foregoing steps, the clique and the attributes of the nodes in the clique are determined according to the attribute values of the nodes after the iteration. The edge vector includes a plurality of eigenvalues describing the data transfer feature between the second node and the first node, and therefore, the target clique with the data transfer feature can be more accurately identified. In addition, the iteration may be limited to updating the attribute value of the second node by using the attribute value of the first node, and therefore, such one-way calculation reduces time complexity of the iteration.

Figure 4:
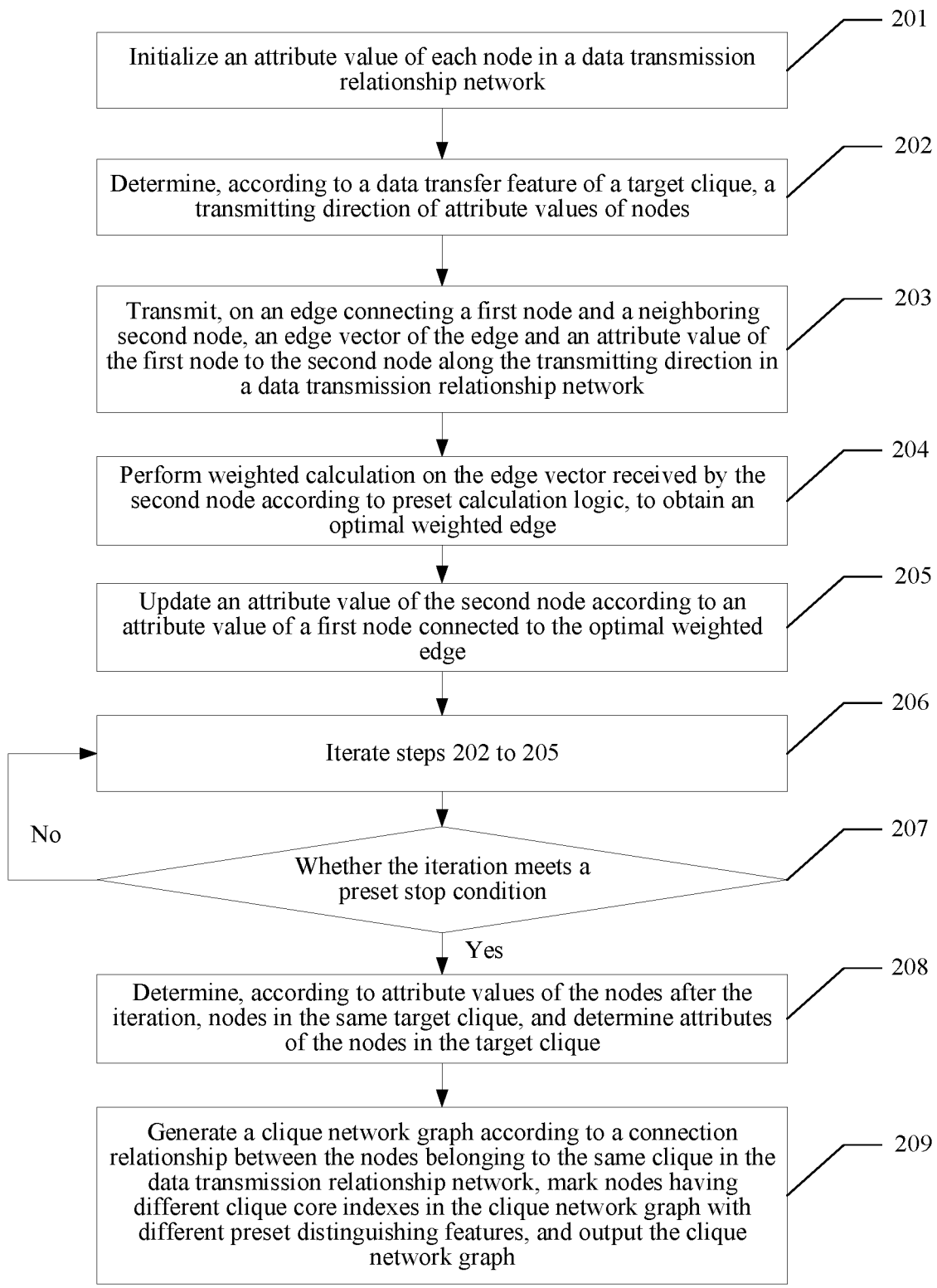
FIG. 4 is a flowchart of a clique network identification method according to an embodiment of this application.

FIG. 4 is a flowchart of a clique network identification method according to another embodiment of this application. As shown in the figure, the method includes:

201: Initialize an attribute value of each node in a data transmission relationship network.

A server initializes the attribute value of each node in the data transmission relationship network. The attribute value includes a node ID and a clique core index. The initializing an attribute value of each node is specifically: using a node ID of a first node as an initial ID of the first node, using a node ID of a second node as an initial ID of the second node, and initializing clique core indexes of the first node and the second node to a preset value. In some embodiments, the preset value is 0.

The clique core index may be used for measuring an importance degree of each node in the data transmission relationship network. Specifically, an update rule of the clique core index may be preset, and may include: the preset value plus or minus an update value. The update value may be customized. For example, the update value is 1 or 10. The update value may be any value, provided that the same update value is set in the entire data transmission relationship network, and determination of the importance degree of a node is not affected.

In some embodiments, if the update rule of the clique core index is the preset value plus one update value every time, a smaller clique core index of a node indicates that the node is closer to a core position in the clique. If the update rule of the clique core index is the preset value minus one update value every time, a larger clique core index of a node indicates that the node is closer to a core position in the clique.

202: Determine, according to a data transfer feature of a to-be-identified target clique, a transmitting direction of attribute values of nodes.

The server determines, according to the data transfer feature of the to-be-identified target clique, the transmitting direction of the attribute values of the nodes.

Specifically, it is determined that the transmitting direction of the attribute values of the nodes is a reverse direction of data transfer between the nodes in a case that the data transfer feature of the to-be-identified target clique is a divergent type.

It is determined that the transmitting direction of the attribute values of the nodes is a direction of data transfer between the nodes in a case that the data transfer feature of the to-be-identified target clique is a convergent type.

203: Transmit, on an edge connecting a first node and a neighboring second node, an edge vector of the edge and an attribute value of the first node to the second node along the transmitting direction in the data transmission relationship network.

The server transmits, on the edge connecting the first node and the neighboring second node, the edge vector of the edge and the attribute value of the first node to the second node along the transmitting direction.

The edge vector includes a plurality of data transfer eigenvalues, and may specifically include: a number of times that a data transfer keyword matches a keyword in the data transfer feature of the target clique and a transfer frequency, number of transfers, and a quantity transferred within a preset period.

The quantity of times that the data transfer keyword matches the keyword in the data transfer feature of the target clique means that the data transfer feature of the target clique includes a large quantity of keywords, and in additional information during data transfer, the quantity of times of matching the keywords is an important eigenvalue that may indicate whether properties of nodes are the same as a property of the target clique. For example, the target clique is a marketing clique, and the keywords in the data transfer feature may include: sales, agency fees, amount, and various goods names. A larger quantity of times that keywords in additional information of data transfer between two nodes match these keywords indicates that the nodes are more likely to belong to the marketing clique. The additional information may be a note, a message, or the like.

A higher transfer frequency of data transfer from the first node to the second node within the preset period indicates a larger weight of a data transfer relationship formed by the first node and the second node. The transfer frequency is specifically, for example, a quantity of days for data transfer within a week.

More number of transfers from the first node to the second node within the preset period indicates a larger weight of the data transfer relationship formed by the first node and the second node. The number of transfers is, for example, a total number of times of data transfer within a week.

A larger quantity transferred from the first node to the second node within the preset period indicates a larger weight of the data transfer relationship formed by the first node and the second node. The transferred quantity is specifically, for example, a total sun of the value transferred within a week.

204: Perform weighted calculation on the edge vector received by the second node according to preset calculation logic, to obtain an optimal weighted edge.

In some embodiments, for data transfer eigenvalues in a plurality of edge vectors received by the second node, eigenvalues of the same type are compared in descending order of weights respectively corresponding to the eigenvalues in the preset calculation logic, and an edge corresponding to a largest eigenvalue is used as an optimal weighted edge.

In some embodiments, the data transmission relationship network is a virtual resource transfer relationship network, and the edge vector received by the second node is a feature vector of virtual resource transfer. Therefore, for virtual resource transfer eigenvalues in a plurality of edge vectors received by the second node, eigenvalues of the same type are compared in descending order of weights respectively corresponding to the eigenvalues in the preset calculation logic, and an edge corresponding to a largest eigenvalue is used as an optimal weighted edge.

The plurality of data transfer eigenvalues include a number of times that a data transfer keyword matches a keyword in the data transfer feature of the target clique and a transfer frequency, number of transfers, and a quantity transferred within a preset period.

In some embodiments, the comparing, for data transfer eigenvalues in edge vectors received by the second node, eigenvalues of the same type in descending order of weights respectively corresponding to the eigenvalues in the preset calculation logic, and using an edge corresponding to a largest eigenvalue as an optimal weighted edge includes:

performing comparison based on the quantity of times that the data transfer keyword matches the keyword in the data transfer feature of the target clique and the transfer frequency, the number of transfers, and the quantity transferred within the preset period in descending order of the weights respectively corresponding to the eigenvalues in the preset calculation logic, and using an edge corresponding to a largest eigenvalue as an optimal weighted edge. In some embodiments, the plurality of virtual resource transfer eigenvalues include a number of times that a virtual resource transfer keyword matches a keyword in a virtual resource transfer feature of the target clique and a transfer frequency, number of transfers, and a transfer quantity of virtual resources within a preset period. Therefore, the performing weighted calculation on the edge vector received by the second node according to preset calculation logic, to obtain an optimal weighted edge is performing comparison based on the quantity of times that the virtual resource transfer keyword matches the keyword in the virtual resource transfer feature of the target clique and the transfer frequency, the number of transfers, and the transfer quantity of virtual resources within the preset period in descending order of the weights respectively corresponding to the eigenvalues in the preset calculation logic, and using an edge corresponding to a largest eigenvalue as an optimal weighted edge.

The optimal weighted edge is an edge with a largest weight between first nodes and the second node, and the virtual resource transfer relationship represented by the edge has a largest weight.

In some embodiments, the calculation logic is weight-related calculation logic, and matches the virtual resource transfer feature of the to-be-identified target clique. That is, the optimal weighted edge varies with different calculation logic, and a weight matches the virtual resource transfer feature of the target clique.

A weight value of each eigenvalue in the edge vector is assigned by the calculation logic, and the weight value assigned by the calculation logic to the eigenvalue matches the virtual resource transfer feature of the target clique. The determination of the optimal weighted edge significantly affects a finally determined clique.

Specifically, the preset calculation logic matches a feature of the target clique. The preset calculation logic varies with different features of to-be-identified cliques.

205: Update an attribute value of the second node according to an attribute value of a first node connected to the optimal weighted edge.

Specifically, the node ID of the second node is updated to a node ID of the first node connected to the optimal weighted edge, and the clique core index of the second node is updated to a clique core index of the first node connected to the optimal weighted edge plus or minus a preset update value according to an update rule. The update value may be any preset value, for example, 1; therefore, the update rule may be updating the clique core index of the second node to the clique core index of the first node connected to the optimal weighted edge plus 1, or updating the clique core index of the second node to the clique core index of the first node connected to the optimal weighted edge minus 1.

When the update rule is updating the clique core index of the second node to the clique core index of the first node connected to the optimal weighted edge plus 1, every time a clique core index of a node is plus 1, a node ID of the node is updated to a node ID of another node, which indicates that the node is not as important as the another node. Therefore, a larger clique core index of a node indicates a lower core degree of the node. If the clique core index is increased, the core degree is decreased.

206: Iterate steps 202 to 205.

207: Determine whether the iteration meets a preset stop condition.

Further, steps of transmitting, on edges connecting first nodes and a neighboring second node, a plurality of edge vectors and attribute values of the first nodes to the second node along the transmitting direction of the attribute values, performing weighted calculation on the plurality of edge vectors received by the second node according to preset calculation logic, to obtain an optimal weighted edge, and updating an attribute value of the second node according to an attribute value of a first node connected to the optimal weighted edge are iterated, until the iteration meets the preset stop condition, that is, steps 202 to 205 are iterated until the iteration meets the preset stop condition.

It may be understood that, after each iteration, it is determined whether the iteration meets the preset stop condition. If the iteration meets the preset stop condition, step 208 is performed; otherwise, a next iteration is performed.

Specifically, the preset stop condition is that a quantity of iterations of steps 202 to step 205 reaches a preset quantity of iterations, or the node ID of each node in the data transmission relationship network after step 202 to step 205 does not change.

During the iteration, if the node ID in the attribute value of the first node connected to the optimal weighted edge is the same as the node ID of the second node, the node ID is not updated, and the clique core index is not updated.

When the iteration meets the preset stop condition, step 208 is performed.

208: Determine, according to attribute values of the nodes after the iteration, nodes in the same target clique, and determine attributes of the nodes in the target clique.

The attribute values of the nodes can be used to determine the nodes belonging to the same clique, to obtain a target clique network. Specifically, nodes with the same node ID belong to a clique.

The attribute values of the nodes can also be used to determine the attributes of the nodes in the clique. The attributes of the nodes are determined specifically according to the update rule and clique core indexes of the nodes. The attribute refers to a core degree of each node in the clique, that is, an importance degree of each node. For a specific determining manner, refer to related descriptions in the foregoing content, and details are not described herein again.

209: Generate a clique network graph according to a connection relationship between the nodes belonging to the same clique in the data transmission relationship network, mark nodes having different clique core indexes in the clique network graph with different preset distinguishing features, and output the clique network graph.

The clique network graph is generated according to the connection relationship between the nodes belonging to the same clique in the data transmission relationship network. Different clique core indexes in the clique network graph are marked with different preset distinguishing features, for example, marked in different preset colors, and the clique network graph is outputted. The node is displayed in a visual manner according to the clique core index, so that a user can intuitively view a core degree of the node in the clique.

Further, before the clique network graph is outputted, each node in the clique network graph is marked with a node ID and a clique core index of the node, and an edge between every two connected nodes is marked with an edge vector, which facilitates the user in clearly learning information of each node and a relationship between nodes in the clique network graph when viewing the clique network graph, thereby providing necessary information for determining a property of the clique, and improving determining accuracy.

To more clearly describe the clique network identification method provided in this embodiment, the following provides descriptions by using an example in which a gambling gang relationship network is dug out from a virtual resource transfer relationship network. The clique network identification method provided in this embodiment is not limited in any form. After being dug out, the gambling gang is reported to a relevant department, to monitor and crack down on the gambling gang.

Figure 5:
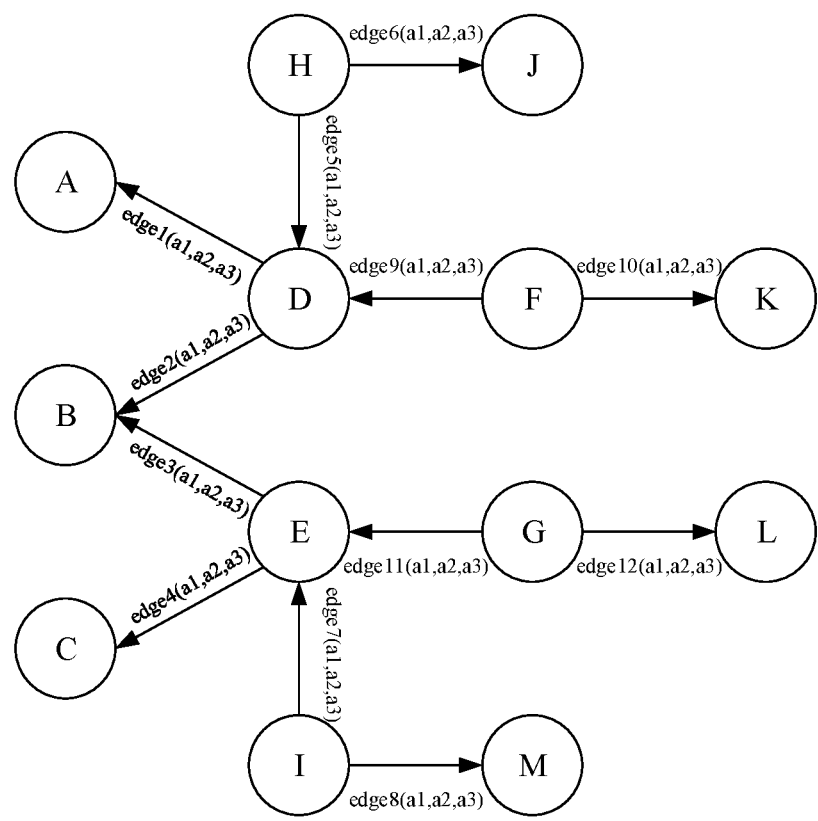
FIG. 5 is a schematic diagram of a virtual resource transfer relationship network in a clique network identification method according to an embodiment of this application.

FIG. 5 is a schematic diagram of a virtual resource transfer relationship network in a clique network identification method according to an embodiment of this application.

As shown in FIG. 5, the virtual resource transfer relationship network includes 13 nodes: a node A, a node B, . . . , and a node M. Among the nodes, 12 edges are generated based on virtual resource transfer relationships: an edge 1, an edge 2, . . . , an edge 11, and an edge 12. Each edge may transfer an edge vector. Each edge vector includes three virtual resource transfer eigenvalues: an eigenvalue a1, an eigenvalue a2, and an eigenvalue a3. The three virtual resource transfer eigenvalues are: a number of times that a virtual resource transfer keyword matches a keyword in a virtual resource transfer feature of a target clique, a number of times of virtual resource transfer within a week, and a total transfer quantity of virtual resources within a week. If a clique with a property of gambling is to be dug out from the virtual resource transfer relationship network, the eigenvalue a1 may specifically be a number of times that a keyword in a note during virtual resource transfer matches a keyword related to gambling. The keyword may be a word related to gambling such as "wager", "counter", and "bet".

Figure 6:
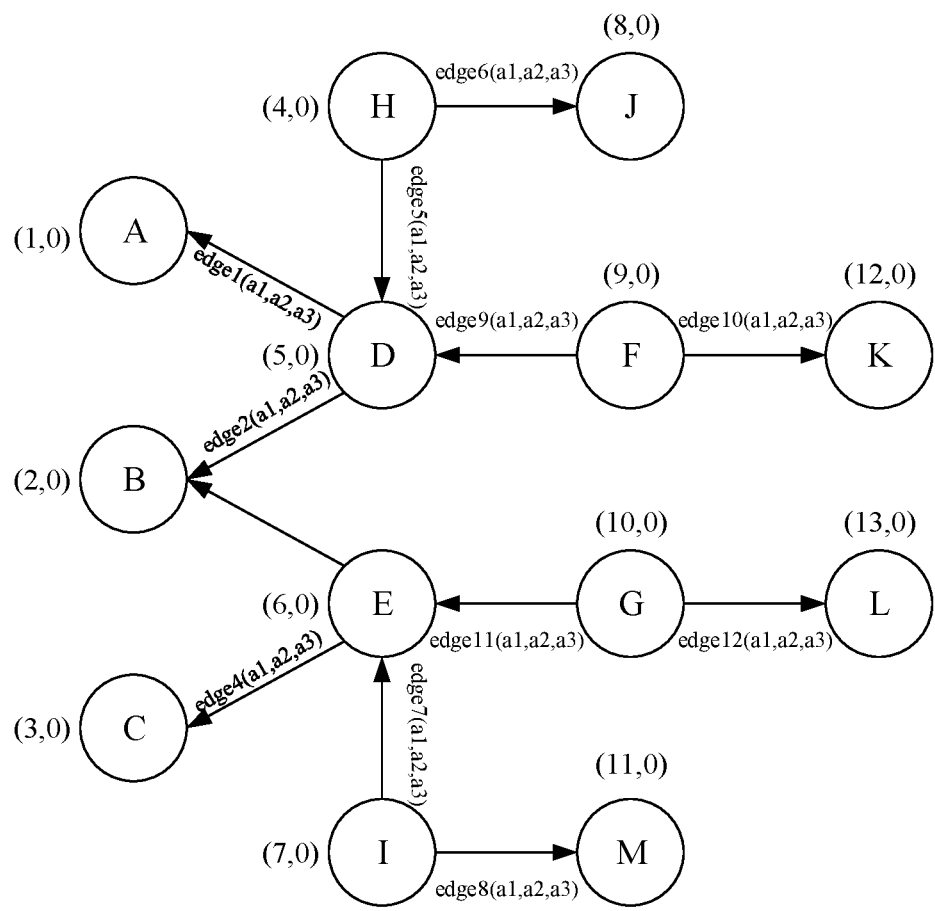
FIG. 6 is a schematic diagram of the virtual resource transfer relationship network in FIG. 5 after an initial clique core index is assigned.

First, an attribute value of each node in the virtual resource transfer relationship network is initialized. A node ID of each node is an initial node ID of the node. The same initial clique core index is defined for each node, which may be 0. The node is marked with a corresponding initial node ID and initial clique core index beside. As shown in FIG. 6, a node A has an initial node ID of 1 and an initial clique core index of 0, and the node A is marked with (1, 0) beside; a node B has an initial node ID of 2 and an initial clique core index of 0, and the node B is marked with (2, 0) beside; and so on.

FIG. 6 is a schematic diagram of the virtual resource transfer relationship network in FIG. 5 after an initial clique core index is assigned. The node IDs of all the nodes in FIG. 6 are different. Specifically, in this embodiment, for example, the initial clique core index of each node is 0, and an update rule of the clique core index is plus 1 for each update.

Figure 7:
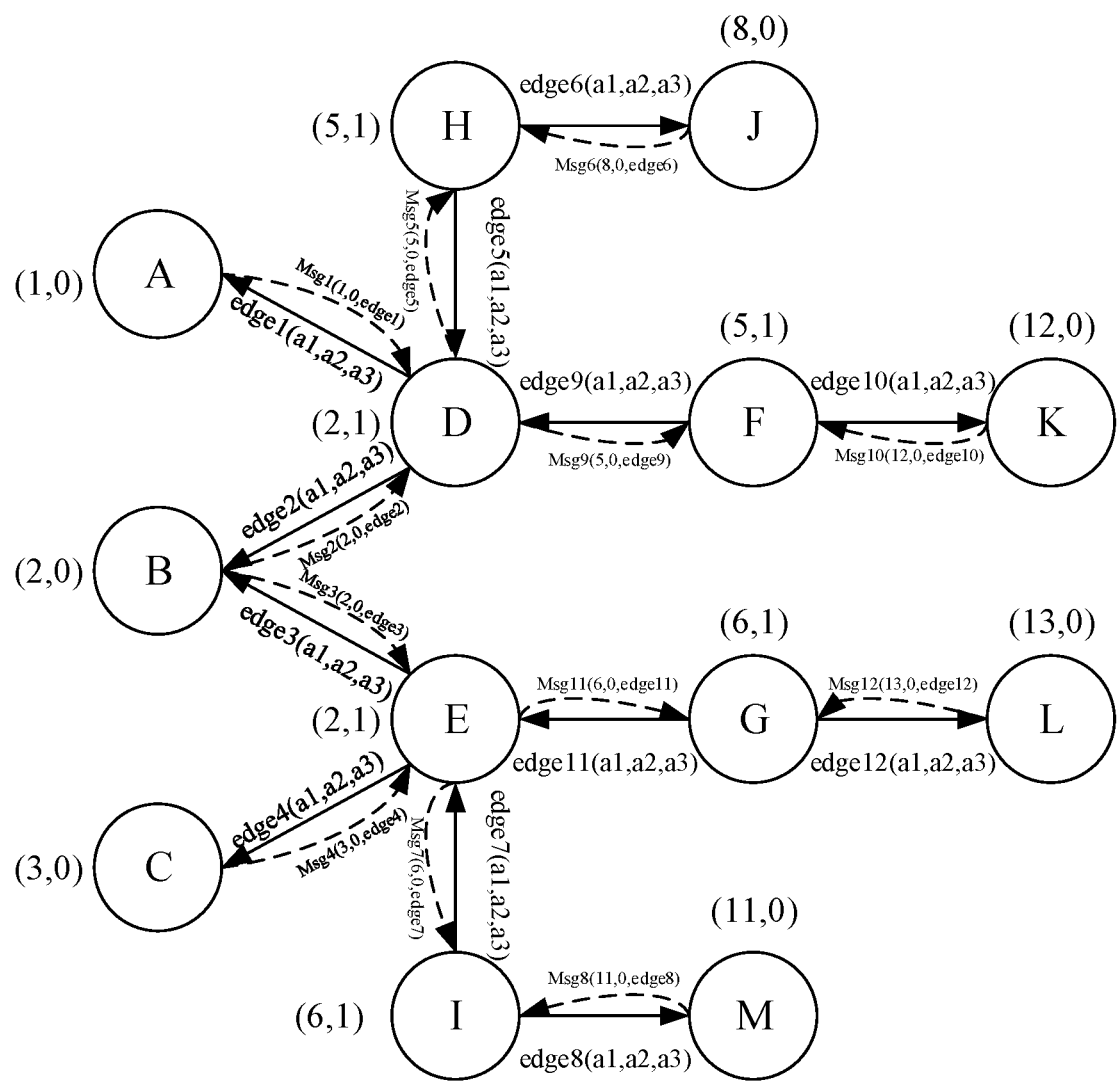
FIG. 7 is a schematic diagram of the virtual resource transfer relationship network in FIG. 6 when a multidimensional vector is transmitted.

If the virtual resource transfer feature of the target clique of the gambling gang is a divergent type, on each edge connecting a first node and a second node, the first node transmits, in a form of a message, an edge vector and an attribute value of the first node to the second node along a reverse direction of virtual resource transfer. The first node is a receiver of virtual resource transfer, and the second node is a sender of virtual resource transfer. FIG. 7 is a schematic diagram of the virtual resource transfer relationship network in FIG. 6 when a multidimensional vector is transmitted.

Weighted calculation is performed on edge vectors in a plurality of messages received by the second node according to preset calculation logic, to obtain a target message.

The node D receives a first message Msg1 and a second message Msg2. The first message Msg1 includes a node ID of the node A, a clique core index of the node A, and a first edge vector edge1 of an edge connecting the node A and the node D. The first edge vector edge1 includes three virtual resource transfer eigenvalues: Msg1.a1, Msg1.a2, and Msg1.a3, which respectively represent a number of times that a keyword in a note during virtual resource transfer from the node D to the node A matches the virtual resource transfer keyword of the target clique, a number of times of virtual resource transfer from the node D to the node A within a week, and a total quantity of virtual resources transferred from the node D to the node A within a week. The second message Msg2 includes a node ID of the node B, a clique core index of the node B, and a second edge vector edge2. The second edge vector edge2 includes three virtual resource transfer eigenvalues: Msg2.a1, Msg2.a2, and Msg2.a3, which respectively represent a number of times that a keyword in a note during virtual resource transfer from the node D to the node B matches the virtual resource transfer keyword of the target clique, a number of times of virtual resource transfer from the node D to the node B within a week, and a total quantity of virtual resources transferred from the node D to the node B within a week.

According to the virtual resource transfer feature of the gambling gang, calculation logic for performing weighted calculation on the virtual resource transfer eigenvalues is determined. A virtual resource transfer eigenvalue with a larger weight indicates a higher priority for comparison. Otherwise, a virtual resource transfer eigenvalue with a smaller weight indicates a lower priority for comparison. In this embodiment, values of a1 with a largest weight are first compared, that is, a value of Msg1.a1 is compared with a value of Msg2.a1. If the value of Msg1.a1 is greater than the value of Msg2.a1, and an absolute value of a difference between the value of Msg1.a1 and the value of Msg2.a1 is greater than a first preset deviation, an edge transmitting the first message Msg1 is used as a current optimal weighted edge. If the value of Msg1.a1 is less than the value of Msg2.a1, and the absolute value of the difference between the value of Msg1.a1 and the value of Msg2.a1 is greater than the first preset deviation, an edge transmitting the second message Msg2 is used as the current optimal weighted edge. If the absolute value of the difference between the value of Msg1.a1 and the value of Msg2.a1 is less than the first preset deviation, values of a2 whose weight is less than that of a1 are compared, that is, a value of Msg1.a2 is compared with a value of Msg2.a2. If the value of Msg1.a2 is greater than the value of Msg2.a2, an absolute value of a difference between the value of Msg1.a2 and the value of Msg2.a2 is greater than a second preset deviation, and the value of Msg1.a2 is greater than a preset value, the edge transmitting the first message Msg1 is used as the current optimal weighted edge. The virtual resource transfer eigenvalue of Msg1.a2 is meaningful only when the value of Msg1.a2 is greater than the preset value. If the value of Msg1.a2 is less than the value of Msg2.a2, the absolute value of the difference between the value of Msg1.a2 and the value of Msg2.a2 is greater than the second preset deviation, and the value of Msg2.a2 is greater than the preset value, the edge transmitting the second message Msg2 is used as the current optimal weighted edge. If the absolute value of the difference between the value of Msg1.a2 and the value of Msg2.a2 is less than the second preset deviation, or the value of Msg1.a2 and the value of Msg2.a2 are neither greater than the preset value, values of a3 whose weight is less than those of a1 and a2 are compared, that is, a value of Msg1.a3 is compared with a value of Msg2.a3. If the value of Msg1.a3 is greater than the value of Msg2.a3, and an absolute value of a difference between the value of Msg1.a3 and the value of Msg2.a3 is greater than a third preset deviation, the edge transmitting the first message Msg1 is used as the current optimal weighted edge. If the value of Msg1.a3 is less than the value of Msg2.a3, and the absolute value of the difference between the value of Msg1.a3 and the value of Msg2.a3 is greater than the third preset deviation, the edge transmitting the second message Msg2 is used as the current optimal weighted edge.

In this example, the optimal weighted edge obtained after the weighted calculation is the edge transmitting the second message Msg2 between the node B and the node D. Therefore, the node ID of the node B is updated to the node ID of the node D, the clique core index of the node B plus 1 is updated to the clique core index of the node D.

Figure 8:
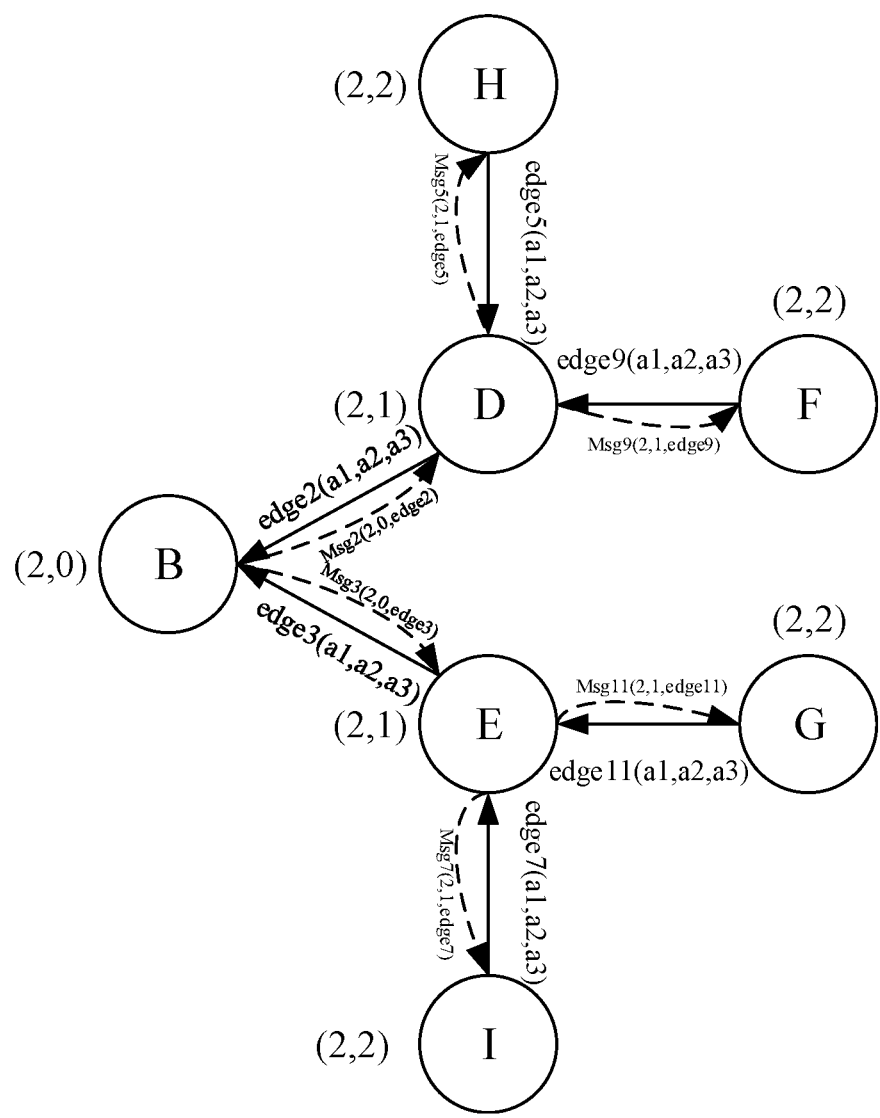
FIG. 8 is a schematic diagram of a target clique identified from the virtual resource transfer relationship network in FIG. 7.

FIG. 8 is a schematic diagram of a target clique identified from the virtual resource transfer relationship network in FIG. 7. The clique network is a virtual resource transfer relationship network of a gambling gang. According to clique core indexes of nodes, roles of the nodes in the gambling gang can be determined. A smaller clique core index of a node indicates greater importance of the node in the gambling gang. In this example, the node H, the node F, the node G, and the node I have a clique core index of 2, which are outer gambling players; the node E and the node D have a clique core index of 1, which are claimants; the node B has a clique core index of 0, which is a banker. In some embodiments, when information of the gambling gang is reported to a relevant department, all virtual resource transfer behavior of the node B may further be collected and reported to the Anti-Money Laundering Department.

In this embodiment, the edge vector of the edge between the first node and the second node is transmitted to the second node along the transmitting direction determined according to the data transfer feature of the to-be-identified target clique; weighted calculation is performed on the edge vector received by the second node according to the preset calculation logic, to obtain the optimal weighted edge; the attribute value of the second node is updated according to the attribute value of the first node connected to the optimal weighted edge; and after a plurality of iterations of the foregoing steps, the clique and the attributes of the nodes in the clique are determined according to the attribute values of the nodes after the iteration. The edge vector includes a plurality of eigenvalues describing the data transfer feature between the second node and the first node, and therefore, the target clique with the data transfer feature can be more accurately identified. In addition, the iteration may be limited to updating the attribute value of the second node by using the attribute value of the first node, and therefore, such one-way calculation reduces time complexity of the iteration.

Figure 9:
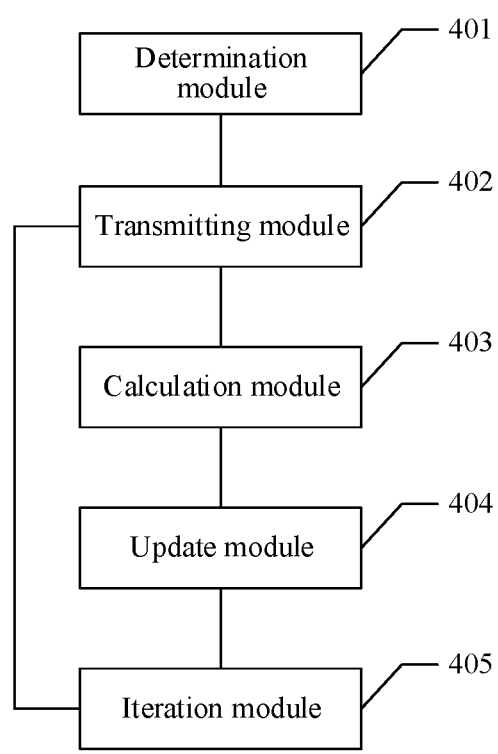
FIG. 9 is a schematic structural diagram of a clique network identification apparatus according to an embodiment of this application.

FIG. 9 is a schematic structural diagram of a clique network identification apparatus according to an embodiment of this application. As shown in FIG. 9, the clique network identification apparatus includes: a determination module 401, configured to determine, according to a data transfer feature of a to-be-identified target clique, a transmitting direction of attribute values of nodes.

In some embodiments, the determination module 401 is further configured to determine that the transmitting direction of the attribute values of the nodes is a reverse direction of data transfer between the nodes in a case that the data transfer feature of the to-be-identified target clique is a divergent type; and to determine that the transmitting direction of the attribute values of the nodes is a direction of data transfer between the nodes in a case that the data transfer feature of the to-be-identified target clique is a convergent type.

The clique network identification apparatus further includes: a transmitting module 402, configured to transmit, on an edge connecting a first node and a neighboring second node, an edge vector of the edge and an attribute value of the first node to the second node along the transmitting direction in a constructed data transmission relationship network, the edge vector including a plurality of data transfer eigenvalues; a calculation module 403, configured to perform weighted calculation on the edge vector received by the second node according to preset calculation logic, to obtain an optimal weighted edge, the calculation logic matching the data transfer feature of the to-be-identified target clique; an update module 404, configured to update an attribute value of the second node according to an attribute value of a first node connected to the optimal weighted edge; and an iteration module 405, configured to iterate the operations of transmitting, on an edge connecting a first node and a neighboring second node, an edge vector of the edge and an attribute value of the first node to the second node along the transmitting direction, performing weighted calculation on the edge vector received by the second node according to preset calculation logic, to obtain an optimal weighted edge, and updating an attribute value of the second node according to an attribute value of a first node connected to the optimal weighted edge, until the iteration meets a preset stop condition.

The clique network identification apparatus further includes: the determination module 401 being further configured to determine, according to attribute values of the nodes after the iteration, nodes in the same target clique, and determine attributes of the nodes in the target clique.

Related details of this embodiment can be referenced in the descriptions of the embodiment shown in FIG. 3.

In this embodiment, the edge vector of the edge between the first node and the second node is transmitted to the second node along the transmitting direction determined according to the data transfer feature of the to-be-identified target clique; weighted calculation is performed on the edge vector received by the second node according to the preset calculation logic, to obtain the optimal weighted edge; the attribute value of the second node is updated according to the attribute value of the first node connected to the optimal weighted edge; and after a plurality of iterations of the foregoing steps, the clique and the attributes of the nodes in the clique are determined according to the attribute values of the nodes after the iteration. The edge vector includes a plurality of eigenvalues describing the data transfer feature between the second node and the first node, and therefore, the target clique with the data transfer feature can be more accurately identified. In addition, the iteration is limited to updating the attribute value of the second node by using the attribute value of the first node, and therefore, such one-way calculation reduces time complexity of the iteration.

Figure 10:
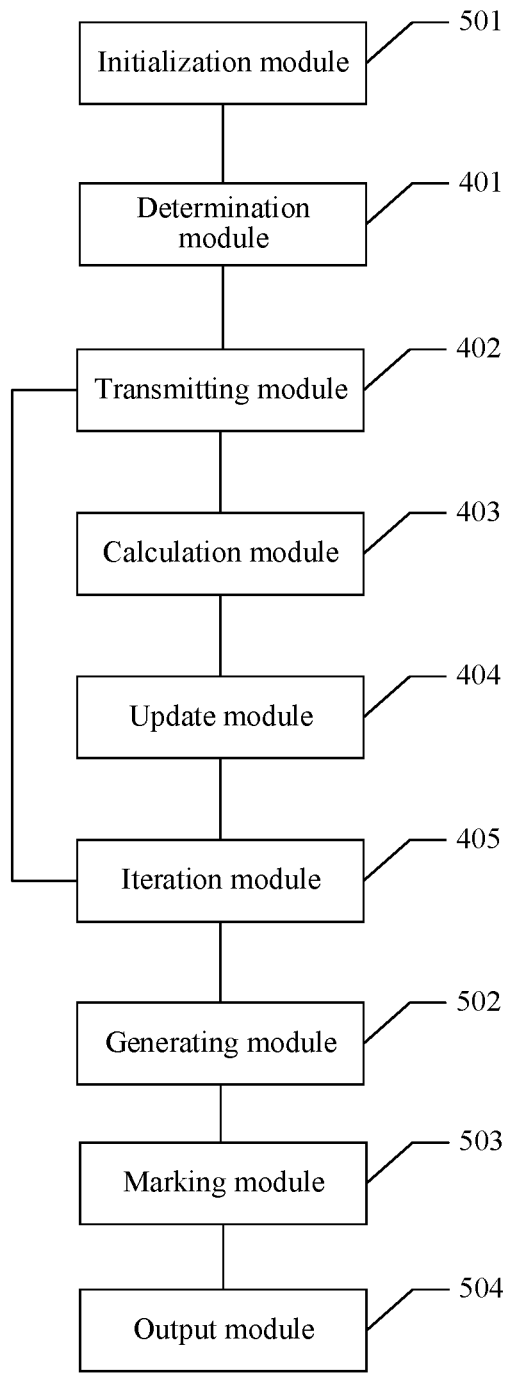
FIG. 10 is a schematic structural diagram of a clique network identification apparatus according to an embodiment of this application.

FIG. 10 is a schematic structural diagram of a clique network identification apparatus according to an embodiment of this application. Different from the clique network identification apparatus shown in FIG. 9, in this embodiment, the attribute value includes a node ID and a clique core index. The apparatus further includes: an initialization module 501, configured to use a node ID of the first node as an initial ID of the first node, use a node ID of the second node as an initial ID of the second node, and initialize clique core indexes of the first node and the second node to a preset value.

The update module 404 is further configured to update the node ID of the second node to the node ID of the first node connected to the optimal weighted edge, and update, according to an update rule, the clique core index of the second node to the clique core index of the first node connected to the optimal weighted edge plus or minus a preset update value.

The determination module 401 is further configured to determine the attributes of the nodes according to the update rule and clique core indexes of the nodes.

The calculation module 403 is further configured to compare, for data transfer eigenvalues in a plurality of edge vectors received by the second node, eigenvalues of the same type in descending order of weights respectively corresponding to the eigenvalues in the preset calculation logic, and use an edge corresponding to a largest eigenvalue as an optimal weighted edge.

The plurality of data transfer eigenvalues include a number of times that a data transfer keyword matches a keyword in the data transfer feature of the target clique and a transfer frequency, number of transfers, and a quantity transferred within a preset period, and the calculation module 403 is further configured to perform comparison based on the quantity of times that the data transfer keyword matches the keyword in the data transfer feature of the target clique and the transfer frequency, the number of transfers, and the quantity transferred within the preset period in descending order of the weights respectively corresponding to the eigenvalues in the preset calculation logic, and use an edge corresponding to a largest eigenvalue as an optimal weighted edge.

Further, the apparatus further includes: a generating module 502, configured to generate a clique network graph according to a connection relationship between the nodes belonging to the same clique in the data transmission relationship network; a marking module 503, configured to mark nodes having different clique core indexes in the clique network graph with different preset distinguishing features; and an output module 504, configured to output the clique network graph; the marking module 503 being further configured to mark each node in the clique network graph with a node ID and a clique core index of the node, and mark an edge between every two connected nodes with an edge vector.

In this embodiment, the edge vector of the edge between the first node and the second node is transmitted to the second node along the transmitting direction determined according to the data transfer feature of the to-be-identified target clique; weighted calculation is performed on the edge vector received by the second node according to the preset calculation logic, to obtain the optimal weighted edge; the attribute value of the second node is updated according to the attribute value of the first node connected to the optimal weighted edge; and after a plurality of iterations of the foregoing steps, the clique and the attributes of the nodes in the clique are determined according to the attribute values of the nodes after the iteration. The edge vector includes a plurality of eigenvalues describing the data transfer feature between the second node and the first node, and therefore, the target clique with the data transfer feature can be more accurately identified. In addition, the iteration is limited to updating the attribute value of the second node by using the attribute value of the first node, and therefore, such one-way calculation reduces time complexity of the iteration.

In the foregoing embodiments, descriptions of the embodiments have respective focuses. For a part that is not described in detail in an embodiment, reference may be made to related descriptions in other embodiments.

Figure 11:
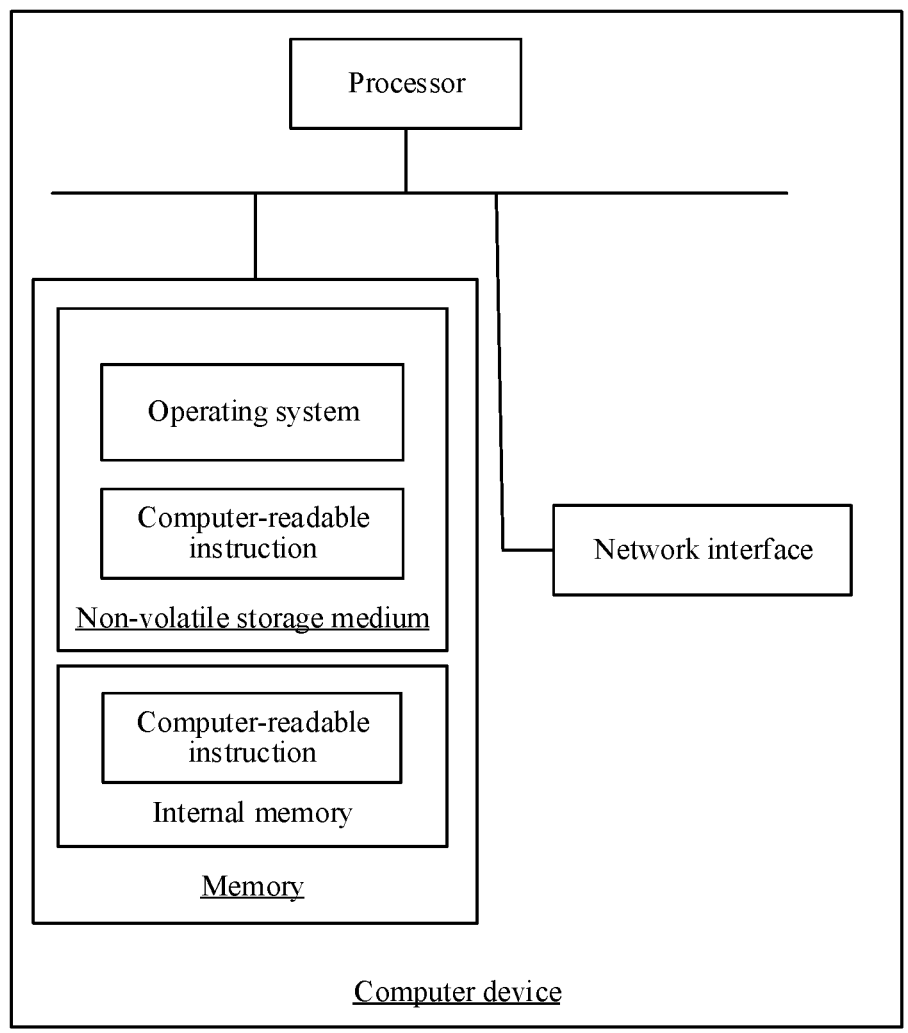
FIG. 11 is a schematic diagram of a hardware structure of a computer device according to an embodiment of this application.

FIG. 11 is a diagram of an internal structure of a computer device according to an embodiment. The computer device may be specifically the server 120 in FIG. 1. As shown in FIG. 11, the computer device includes a processor, a memory, and a network interface that are connected through a system bus. The memory includes a non-volatile storage medium and an internal memory. The non-volatile storage medium of the computer device stores an operating system, and may further store a computer-readable instruction. The computer-readable instruction, when executed by the processor, may cause the processor to implement the clique network identification method. The internal memory may also store a computer-readable instruction, and the computer-readable instruction, when executed by the processor, may cause the processor to perform the clique network identification method. A person skilled in the art may understand that, the structure shown in FIG. 11 is merely a block diagram of a partial structure related to the solution of this application, and does not limit the computer device to which the solution of this application is applied. Specifically, the computer device may include more or fewer components than those shown in the figure, or some components may be combined, or a different component deployment may be used.

In an embodiment, the clique network identification apparatus provided in this application may be implemented in a form of a computer-readable instruction, and the computer-readable instruction may be run on the computer device shown in FIG. 11. The memory of the computer device may store program modules forming the clique network identification apparatus, for example, the determination module 401, the transmitting module 402, the calculation module 403, the update module 404, and the iteration module 405 shown in FIG. 9. The computer-readable instruction including the program modules causes the processor to perform the steps of the clique network identification method in the embodiments of this application described in this specification.

Further, an embodiment of this application further provides a computer-readable storage medium. The computer-readable storage medium may be disposed in the clique network identification apparatus in the foregoing embodiments. The computer-readable storage medium may be the memory in the embodiment shown in FIG. 11. The computer-readable storage medium stores a computer program. The program, when executed by a processor, implements the clique network identification method described in the embodiments shown in FIG. 3 to FIG. 8. Further, the computer-readable storage medium may alternatively be any medium that can store program code, such as a USB flash drive, a removable hard disk, a read-only memory (ROM), a random access memory (RAM), a magnetic disk, or an optical disc.

A person of ordinary skill in the art may understand that all or some of the procedures of the method in the foregoing embodiments may be implemented by a computer-readable instruction instructing relevant hardware. The computer-readable instruction may be stored in a non-volatile computer-readable storage medium. When the program is executed, the procedures in the foregoing method embodiments may be implemented. Any reference to a memory, storage, database or another medium used in the embodiments provided in this application may include a non-volatile and/or volatile memory. The non-volatile memory may include a ROM, a programmable ROM (PROM), an electrically programmable ROM (EPROM), an electrically erasable programmable ROM (EEPROM), or a flash memory. The volatile memory may include a RAM or an external cache. By way of illustration rather than limitation, the RAM is available in a plurality of forms, such as a static RAM (SRAM), a dynamic RAM (DRAM), a synchronous DRAM (SDRAM), a dual data rate SDRAM (DDRSDRAM), an enhanced SDRAM (ESDRAM), a synchronization link (Synchlink) DRAM (SLDRAM), a rambus direct RAM (RDRAM), a direct rambus dynamic RAM (DRDRAM), and a rambus dynamic RAM (RDRAM). The modules described as separate parts may or may not be physically separate, and parts displayed as modules may or may not be physical modules, may be located in one position, or may be distributed on a plurality of network modules. Some or all modules thereof may be selected based on specific requirements, to achieve the objectives of the solutions in the embodiments.

For brief description, the foregoing method embodiments are represented as a series of actions. However, a person skilled in the art is to appreciate that this application is not limited to the described order of the actions, because according to this application, some steps may be performed in other orders or simultaneously. Secondarily, a person skilled in the art is to appreciate that the embodiments described in this specification all belong to exemplary embodiments, and the related actions and modules are not necessarily required by this application. In the embodiments, the descriptions such as "first" and "second" are used merely for naming, but are not intended to limit a sequence. Detailed above are the clique network identification method and apparatus, the server, and the computer-readable storage medium provided in this application. A person skilled in the art may make modifications to the specific implementations and application scopes according to the ideas of the embodiments of this application. In conclusion, the content of the specification should not be construed as a limitation to this application.

What is claimed is:

1. A method for identifying a clique network using a Pregel graph computing framework, comprising:
   determining, according to a data transfer feature of a target clique, a transmitting direction of attribute values of nodes;
   transmitting, on an edge connecting a first node and a neighboring second node, an edge vector of the edge and an attribute value of the first node to the second node along the transmitting direction in a constructed data transmission relationship network, the edge vector comprising a plurality of data transfer eigenvalues;
   performing, weighted calculation on the edge vector received by the second node according to a preset calculation logic, to obtain an optimal weighted edge, the calculation logic matching the data transfer feature of the target clique;
   updating, an attribute value of the second node according to an attribute value of a first node connected to the optimal weighted edge;
   iterating, operations of transmitting, on an edge connecting a first node and a neighboring second node, an edge vector of the edge and an attribute value of the first node to the second node along the transmitting direction, performing weighted calculation on the edge vector received by the second node according to the preset calculation logic, to obtain an optimal weighted edge, and updating an attribute value of the second node according to an attribute value of a first node connected to the optimal weighted edge, until the iteration meets a preset stop condition; and
   determining, according to attribute values of the nodes after the one or more iterations, nodes in the target clique, and determining attributes of the nodes in the target clique.

2. The method for identifying a clique network according to claim 1, wherein the attribute value comprises a node identification (ID) and a clique core index, and before the transmitting, on an edge connecting a first node and a neighboring second node, an edge vector of the edge and an attribute value of the first node to the second node along the transmitting direction in a constructed data transmission relationship network, the method further comprises:
   using, a node ID of the first node as an initial ID of the first node, using a node ID of the second node as an initial ID of the second node, and initializing clique core indexes of the first node and the second node to a preset value.

3. The method for identifying a clique network according to claim 2, wherein the updating, an attribute value of the second node according to an attribute value of a first node connected to the optimal weighted edge comprises:
   updating, the node ID of the second node to the node ID of the first node connected to the optimal weighted edge, and updating, according to an update rule, the clique core index of the second node to the clique core index of the first node connected to the optimal weighted edge plus or minus a preset update value; and
   the determining attributes of the nodes in the target clique comprises:
   determining, the attributes of the nodes according to the update rule and clique core indexes of the nodes.

4. The method for identifying a clique network according to claim 3, wherein the performing weighted calculation on the edge vector received by the second node according to preset calculation logic, to obtain an optimal weighted edge comprises:
   comparing, for data transfer eigenvalues in a plurality of edge vectors received by the second node, eigenvalues of the same type in descending order of weights respectively corresponding to the eigenvalues in the preset calculation logic, and using an edge corresponding to a largest eigenvalue as an optimal weighted edge.

5. The method for identifying a clique network according to claim 4, wherein the plurality of data transfer eigenvalues comprise a number of times that a data transfer keyword matches a keyword in the data transfer feature of the target clique and a transfer frequency, a number of transfers, and a quantity transferred within a preset period, and the comparing, for data transfer eigenvalues in a plurality of edge vectors received by the second node, eigenvalues of the same type in descending order of weights respectively corresponding to the eigenvalues in the preset calculation logic, and using an edge corresponding to a largest eigenvalue as an optimal weighted edge comprises:
   performing comparison, based on the quantity of times that the data transfer keyword matches the keyword in the data transfer feature of the target clique and the transfer frequency, the number of transfers, and the quantity transferred within the preset period in descending order of the weights respectively corresponding to the eigenvalues in the preset calculation logic, and using an edge corresponding to a largest eigenvalue as an optimal weighted edge.

6. The method for identifying a clique network according to claim 5, after the determining, according to attribute values of the nodes after the iteration, nodes in the same target clique, and determining attributes of the nodes in the target clique, further comprising:
   generating, a clique network graph according to a connection relationship between the nodes belonging to the same clique in the data transmission relationship network; and
   marking, nodes having different clique core indexes in the clique network graph with different preset distinguishing features, and outputting the clique network graph.

7. The method for identifying a clique network according to claim 6, after the generating a clique network graph, further comprising:

marking, each node in the clique network graph with a node ID and a clique core index of the node, and marking an edge between every two connected nodes with an edge vector.

8. The method for identifying a clique network according to claim 1, wherein the determining, by a computer device according to a data transfer feature of a target clique, a transmitting direction of attribute values of nodes comprises:

determining, that the transmitting direction of the attribute values of the nodes is a reverse direction of data transfer between the nodes in a case that the data transfer feature of the target clique is a divergent type; and determining, that the transmitting direction of the attribute values of the nodes is a direction of data transfer between the nodes in a case that the data transfer feature of the target clique is a convergent type.

9. One or more non-transitory storage media storing a computer-readable instruction, the computer-readable instruction, when executed by one or more processors, causing the one or more processors to perform:

determining, according to a data transfer feature of a target clique, a transmitting direction of attribute values of nodes;

transmitting, on an edge connecting a first node and a neighboring second node, an edge vector of the edge and an attribute value of the first node to the second node along the transmitting direction in a constructed data transmission relationship network, the edge vector comprising a plurality of data transfer eigenvalues;

performing, weighted calculation on the edge vector received by the second node according to a preset calculation logic, to obtain an optimal weighted edge, the calculation logic matching the data transfer feature of the target clique;

updating, an attribute value of the second node according to an attribute value of a first node connected to the optimal weighted edge;

iterating, operations of transmitting, on an edge connecting a first node and a neighboring second node, an edge vector of the edge and an attribute value of the first node to the second node along the transmitting direction, performing weighted calculation on the edge vector received by the second node according to the preset calculation logic, to obtain an optimal weighted edge, and updating an attribute value of the second node according to an attribute value of a first node connected to the optimal weighted edge, until the iteration meets a preset stop condition; and determining, according to attribute values of the nodes after the one or more iterations, nodes in the target clique, and determining attributes of the nodes in the target clique.

10. The storage medium according to claim 9, wherein the attribute value comprises a node identification (ID) and a clique core index, and he computer-readable instruction further causing the processor to:

use a node ID of the first node as an initial ID of the first node, use a node ID of the second node as an initial ID of the second node, and initialize clique core indexes of the first node and the second node to a preset value.

11. The storage medium according to claim 10, wherein the he computer-readable instruction further causing the processor to update the node ID of the second node to the node ID of the first node connected to the optimal weighted edge, and update, according to an update rule, the clique core index of the second node to the clique core index of the first node connected to the optimal weighted edge adding or subtracting a preset update value; and determine the attributes of the nodes according to the update rule and clique core indexes of the nodes.

12. The storage medium according to claim 11, wherein the he computer-readable instruction further causing the processor to compare, for data transfer eigenvalues in a plurality of edge vectors received by the second node, eigenvalues of the same type in descending order of weights respectively corresponding to the eigenvalues in the preset calculation logic, and use an edge corresponding to a largest eigenvalue as an optimal weighted edge, wherein the plurality of data transfer eigenvalues comprise a number of times that a data transfer keyword matches a keyword in the data transfer feature of the target clique and a transfer frequency, number of transfers, and a quantity transferred within a preset period; and perform comparison based on the quantity of times that the data transfer keyword matches the keyword in the data transfer feature of the target clique and the transfer frequency, the number of transfers, and the quantity transferred within the preset period in descending order of the weights respectively corresponding to the eigenvalues in the preset calculation logic, and use an edge corresponding to a largest eigenvalue as an optimal weighted edge.

13. The storage medium according to claim 12, wherein he computer-readable instruction further causing the processor to:

generate a clique network graph according to a connection relationship between the nodes belonging to the same clique in the data transmission relationship network;

mark nodes having different clique core indexes in the clique network graph with different preset distinguishing features; and output the clique network graph, mark each node in the clique network graph with a node ID and a clique core index of the node, and mark an edge between every two connected nodes with an edge vector.

14. A computer device, comprising a memory and a processor, the memory storing a computer-readable instruction, the computer-readable instruction, when executed by the processor, causing the processor to perform the following operations: determining, according to a data transfer feature of a target clique, a transmitting direction of attribute values of nodes;

transmitting, on an edge connecting a first node and a neighboring second node, an edge vector of the edge and an attribute value of the first node to the second node along the transmitting direction in a constructed data transmission relationship network, the edge vector comprising a plurality of data transfer eigenvalues;

performing weighted calculation on the edge vector received by the second node according to preset calculation logic, to obtain an optimal weighted edge, the calculation logic matching the data transfer feature of the target clique;

updating an attribute value of the second node according to an attribute value of a first node connected to the optimal weighted edge;

iterating operations of transmitting, on an edge connecting a first node and a neighboring second node, an edge vector of the edge and an attribute value of the first node to the second node along the transmitting direction, performing weighted calculation on the edge vector received by the second node according to preset calculation logic, to obtain an optimal weighted edge, and updating an attribute value of the second node according to an attribute value of a first node connected to the optimal weighted edge, until the iteration meets a preset stop condition; and determining, according to attribute values of the nodes after the iteration, nodes in the target clique, and determining attributes of the nodes in the target clique.

15. The computer device according to claim 14, wherein the attribute value comprises a node identification (ID) and a clique core index, and before the transmitting, on an edge connecting a first node and a neighboring second node, an edge vector of the edge and an attribute value of the first node to the second node along the transmitting direction in a constructed data transmission relationship network, the computer-readable instruction further causes the processor to perform the following operation:

using a node ID of the first node as an initial ID of the first node, using a node ID of the second node as an initial ID of the second node, and initializing clique core indexes of the first node and the second node to a preset value.

16. The computer device according to claim 15, wherein the updating an attribute value of the second node according to an attribute value of a first node connected to the optimal weighted edge comprises:

updating the node ID of the second node to the node ID of the first node connected to the optimal weighted edge, and updating, according to an update rule, the clique core index of the second node to the clique core index of the first node connected to the optimal weighted edge plus or minus a preset update value; and wherein the determining attributes of the nodes in the target clique comprises:

determining the attributes of the nodes according to the update rule and clique core indexes of the nodes.

17. The computer device according to claim 16, wherein the performing weighted calculation on the edge vector received by the second node according to preset calculation logic, to obtain an optimal weighted edge comprises:

comparing, for data transfer eigenvalues in a plurality of edge vectors received by the second node, eigenvalues of the same type in descending order of weights respectively corresponding to the eigenvalues in the preset calculation logic, and using an edge corresponding to a largest eigenvalue as an optimal weighted edge.

18. The computer device according to claim 17, wherein the plurality of data transfer eigenvalues comprise a number of times that a data transfer keyword matches a keyword in the data transfer feature of the target clique and a transfer frequency, number of transfers, and a quantity transferred within a preset period, and the comparing, for data transfer eigenvalues in a plurality of edge vectors received by the second node, eigenvalues of the same type in descending order of weights respectively corresponding to the eigenvalues in the preset calculation logic, and using an edge corresponding to a largest eigenvalue as an optimal weighted edge comprises:

performing comparison based on the quantity of times that the data transfer keyword matches the keyword in the data transfer feature of the target clique and the transfer frequency, the number of transfers, and the quantity transferred within the preset period in descending order of the weights respectively corresponding to the eigenvalues in the preset calculation logic, and using an edge corresponding to a largest eigenvalue as an optimal weighted edge.

19. The computer device according to claim 18, after the determining, according to attribute values of the nodes after the iteration, nodes in the target clique, and determining attributes of the nodes in the target clique, the computer-readable instruction further causing the processor to perform:

generating a clique network graph according to a connection relationship between the nodes belonging to the same clique in the data transmission relationship network; and marking nodes having different clique core indexes in the clique network graph with different preset distinguishing features, and outputting the clique network graph.

20. The computer device according to claim 19, after the generating a clique network graph, the computer-readable instruction further causing the processor to perform:

marking each node in the clique network graph with a node ID and a clique core index of the node, and marking an edge between every two connected nodes with an edge vector.

* * * * *